United States Patent [19]

Roy

[11] 4,247,583
[45] Jan. 27, 1981

[54] INSULATING STRUCTURE WITH POLYGONAL CELLS

[76] Inventor: Paul D. Roy, 2365 Henrietta Ave., La Crescenta, Calif. 91214

[21] Appl. No.: 956,064

[22] Filed: Oct. 30, 1978

[51] Int. Cl.³ .............................................. B32B 3/12
[52] U.S. Cl. .................................... 428/116; 52/406; 52/806; 428/36; 428/464
[58] Field of Search .................. 428/116–118, 428/464, 36; 156/197; 52/2, 404, 406, 806, 809; 410/154

[56] References Cited

U.S. PATENT DOCUMENTS

| | | | |
|---|---|---|---|
| 1,914,207 | 6/1933 | Knight | 428/73 X |
| 1,942,989 | 1/1934 | Thomson | 428/117 |
| 2,098,193 | 11/1937 | Munters | 428/72 X |
| 2,268,637 | 1/1942 | Bernstein | 428/116 X |
| 2,417,435 | 3/1947 | Munters | 428/73 X |
| 2,527,752 | 10/1950 | May | 156/197 X |
| 2,662,043 | 12/1953 | Clements | 428/120 |
| 2,750,313 | 6/1956 | Schwartz et al. | 52/406 |
| 2,777,786 | 1/1957 | Schwartz et al. | 52/406 |
| 2,983,640 | 5/1961 | Knoll et al. | 428/116 X |
| 3,160,131 | 12/1964 | George et al. | 428/116 X |
| 3,389,665 | 6/1968 | Kauffman | 428/116 X |
| 3,405,659 | 10/1968 | Hees | 428/116 X |

*Primary Examiner*—Henry F. Epstein
*Attorney, Agent, or Firm*—Boniard I. Brown

[57] ABSTRACT

An insulating structure or matrix with polygonal cells is formed with flexible partition sheets, each sheet being a laminate including a layer of paper and a layer of metallic foil, the optically reflecting surfaces of adjacent sheets facing in the same direction. Segments of adjacent sheets are joined by adhesive seams and cooperate to define polygonal spaces in a honeycomb-like structure upon expansion of the matrix structure. The matrix is bounded by flanges at its outer surfaces, parallel with the matrix in contracted configuration, for securement of the insulating structure in place upon installation. An alternative embodiment has optically reflective layers at both sides of a paper layer.

9 Claims, 9 Drawing Figures

INSULATING STRUCTURE WITH POLYGONAL CELLS

BACKGROUND OF THE INVENTION

The invention relates to insulating materials; it relates, more particularly, to an interconnected, expandable structure composed of laminated membranes incorporating at least one layer of a flexible material of poor thermal conductivity and at least one layer of reflective metal foil.

The art of constructing insulation adapted to be disposed between a source of heat and a sink for same, is old; all habitable structures are designed to keep the internal volume of the structure cooler, or warmer, than the surrounding atmosphere. All walls surrounding such structures are, therefore, constructed to exhibit as low a thermal transmission capacity as may be compatible with the materials employed and economic costs and benefits predicted.

In particular, it is known to utilize a material provided with internal subdivisions so as to reduce the direct heat conductivity paths, and to suppress the tendency of the gases trapped in the subdivisions towards natural convection heat transfer. Such commonly employed insulating materials as mineral wool, glass fiber batts, plastic and elastomeric foams, low-density ceramics and others operate on the principle of defining a volume with the least possible solid mass and the separation of the air entrapped in the structure into independent convective cells.

It is also well-known that reflective surfaces, such as bright metallic foils, have a tendency to reflect incident radiant heat, a form of electromagnetic radiation, towards the source. The combination of the aforementioned insulating techniques is also known, as for example in the provision of commercial glass fibre insulation in paper-enclosed batts with one surface composed of, or laminated with, an aluminum foil surface. Such materials are commonly installed in the walls of structures with stud walls and provide a barrier to all three forms of heat transfer; conduction, convection and radiation.

The prior art includes insulating panels or assemblies in which a semi-rigid sheet material, typically paper, is employed to form a cellular structure in the form of a panel. The cells formed in such structure may be filled with a fibrous insulation, or with a rigid, castable material, or may be left filled with entrapped air. Such structures of the prior art are described in U.S. Pat. No. 1,914,207 to KNIGHT; U.S. Pat. No. 1,942,989 to THOMSON; U.S. Pat. No. 2,098,193 and U.S. Pat. No. 2,417,435 to MUNTERS; and U.S. Pat. No. 2,662,043 to CLEMENTS.

Typically, the structure of the prior art are employed in the form of light-weight panels whose transportation to the user and installation in the field both require extensive labor and affect their economic utility. Furthermore, while such structures are capable of reducing the conductive and convective heat transfer modes, they generally fail to provide effective means for interdicting radiant heat transmission.

It is the primary object of the invention to provide an improved heat transfer barrier structures with substantially polygonal cells defined by impermeable membranes laminated from at least one layer of an insulating sheet and one layer of a reflective foil.

It is an object of the invention to teach the construction and use of insulating structures with the foregoing characteristics, which may be transported in a collapsed condition and expanded by the user into the final configuration.

It is an additional object of the invention to define an insulating structure which retains its insulating properties over a wide range of linear expansion from its contracted or collapsed condition and which, furthermore, allows the structure to conform to substantial radii of curvature in two mutually orthogonal planes, so as to allow its use and installation in irregular spaces and about curvilinear and other shaped objects.

SUMMARY OF THE INVENTION

The foregoing objects of the invention and other objects and advantages which shall become apparent from the detailed description of the preferred embodiment, are attained in a structure composed of parallel laminated sheets or strips. The laminated structure of each sheet or strip is subdivided into adjoining regions, typically about ⅜ inch wide, and coated with an adhesive in a pattern wherein one region is coated on one face, the adjoining regions are uncoated, and the regions proximate to the adjoining regions are coated on the other face, so that as sheets are stacked in a mirror-image alignment, the adhesive-coated regions adhere to each other and upon expansion the structure assumes the form of a honeycomb with essentially polygonal cells.

The base material for each laminated sheet in the insulation structure is a flexible material of low conductivity, typically paper, and the foil laminate, which may be on one or both faces of the base strip, is a reflecting metallic or metallized plastic foil. In the preferred mode of construction, the assembly is faced at either end or limit of the stacked sheets, by sheets of a more rigid material, such as cardboard.

It will be understood that the dimensions of the insulation structure at right angles to the honeycomb openings is limited only by the manufacturing technique utilized, and that the description of adhesive application is only illustrative. The use of an adhesive capable of bonding to an uncoated surface of the laminated partitions will permit the application of such adhesive on only one face of each sheet or strip, and the final form of the structure may be ensured by the staggered application of such adhesive to the surfaces of successive strips in the built-up structure of the insulation.

In general, any of the known techniques employed in the manufacture of decorative paper articles, structural honeycomb reinforcements, and similar structures with expandable polygonal partitioned matrices may be utilized in the construction of the insulating structure of the invention, so long as the walls are themselves laminates of an insulating sheet and at least one reflecting sheet.

DESCRIPTION OF THE PREFERRED EMBODIMENT

Figure 1:
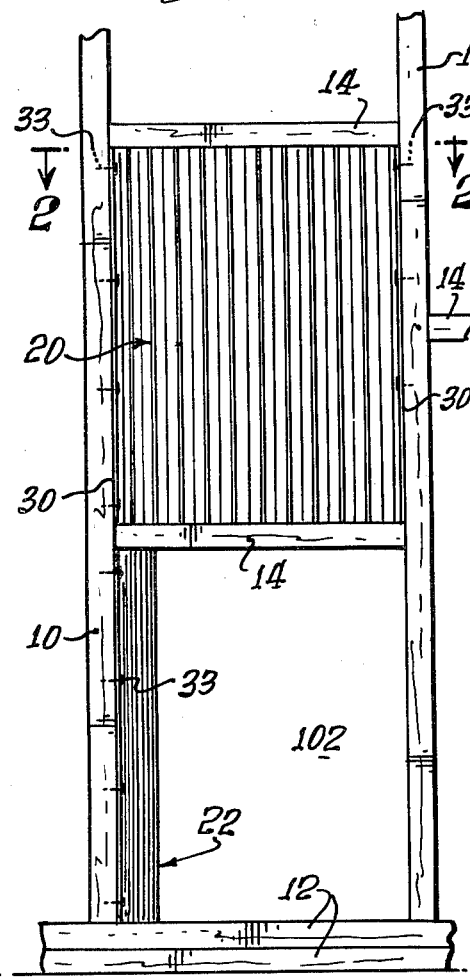
FIG. 1 is an elevational view of a portion of a stud wall wherein an insulation structure of the invention is installed in the interspace defined by the vertical members and the horizontal fire-stops.

FIG. 1 shows a section of a typical framed wall, defined by vertical studs 10 supported on a double plate 12, with the vertically aligned hollow interspaces between the studs and the internal and external sheathing subdivided by horizontal fire stops and block pieces 14. To reduce the heat loss or heat gain the interspaces are filled with an insulating structure or material, including an insulating matrix 20, so constructed that it subdivides the interspace into elongated spaces of hexagonal cross-section filled with air. An insulating structure 22, affixed to one of the studs 10, is ready for expansion across the intervening space 102 to the opposite stud.

The insulating structure of the invention is defined by a plurality of polygonal or hexagonal tubes with flexible walls of a material of low thermal conductivity and with at least one reflecting face. The tubes are mounted in such a manner that their open ends point away from the faces, in FIG. 1 the exterior and interior wall surfaces, across which the transfer of heat is to be minimized. It is possible to orient these polygonal tubes in any direction—vertically or horizontally, for example—but in general the horizontal alignment of the matrix 20 is to be preferred over the vertical alignment of the matrix 22. This preference arises from the reduction in convection currents within the tubes themselves, such currents being essentially proportional to the height of the cell within which they may develop, so that the horizontal alignment, wherein the characteristic dimension of the cells is equal to the spacing between adjacent surfaces of the honeycomb structure itself, will suppress convective heat transfer more effectively than the vertical alignment in which convection currents can develop along the entire length of a given insulating matrix in the vertical dimension.

Figure 2:
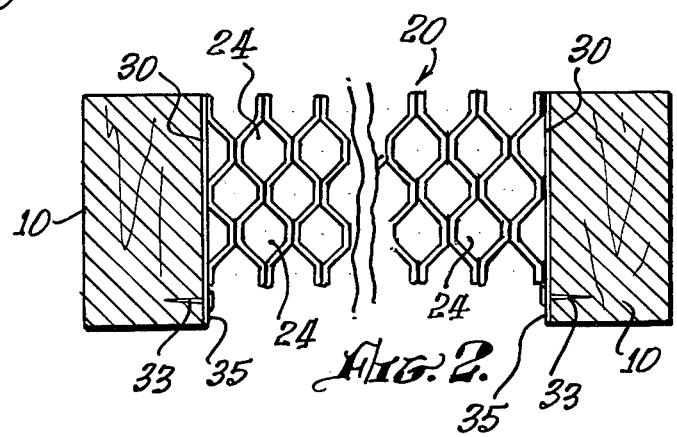
FIG. 2 is a sectional view through the insulation structure, taken at line 2—2 in FIG. 1.

FIG. 2 is a transverse section through the insulating structure 20 (taken along section line 2—2 in FIG. 1), showing the substantially hexagonal cross-section of individual insulating cells 24. The expanded insulating structure is affixed to studs 10 by means of terminal flanges 30 at either limit of the matrix, the flanges 30 being stapled or nailed to the framing members by fasteners 33.

Figure 3:
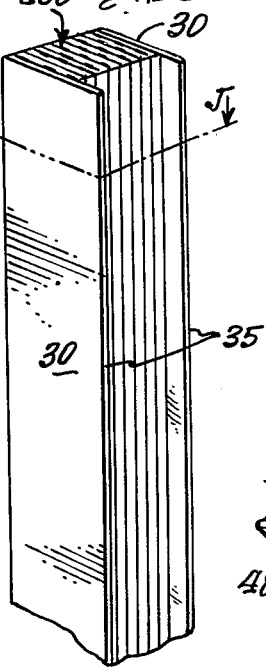
FIG. 3 is a perspective view of the insulation structure of the invention in its contracted configuration.

FIG. 3 is a perspective view of a typical insulating matrix 200 of the invention in its contracted or collapsed condition, with stacked sheets or partitions 50 therein bounded by flanges 30. Each sheet 50 in the matrix 200 is a laminate of a sheet of flexible paper and a sheet of metal, suitably aluminum, foil. Adjacent sheets are secured to each other by adhesive seams 44, so applied and spaced that upon the outward separation of the flanges 30 the matrix 200 expands into parallel, substantially hexagonal insulating cells 24.

The contracted condition of the insulating structure, as shown in FIG. 3, is the one in which the material is readily transported to the user, forming a relatively rigid stack of reasonably high density. These physical characteristics of the contracted insulating matrix contribute to an insensitivity to loading applied in the course of transport, and permit relatively low freight charges since the material is not bulky or fragile. The final trimming into the size and shape desired for the final application is also performed in the collapsed condition, as for example along a cut line J—J in FIG. 3, an operation which the physical strength and compactness of the material facilitates.

Figure 4:
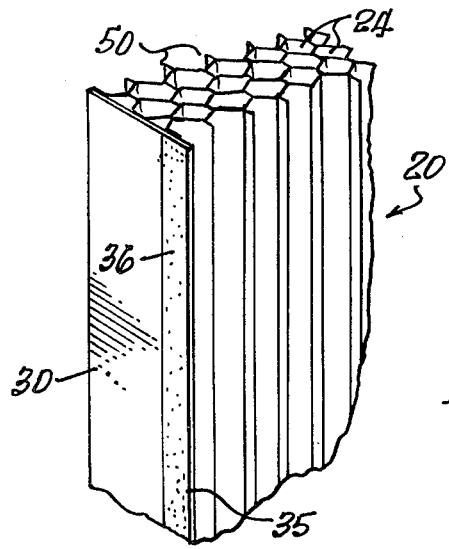
FIG. 4 is a partial perspective view of the insulation structure of FIG. 3 after trimming and expansion thereof for installation.

FIG. 4 is a partial perspective view of the insulating structure of FIG. 3 in the expanded condition, illustrating the manner in which the separation of flanges 30 expands the matrix into typical, honwycomb-like cells. This view also illustrates the manner in which an extended portion 35 of a flange 30 may be utilized for the affixing of the matrix to the surface or structure which is to be insulated thereby. In particular, the extended flange-portion 35 may be utilized for nailing or stapling, or may, alternately, be provided with an adhesive coating 36 and secured into place therethrough.

Figures 5, 7:
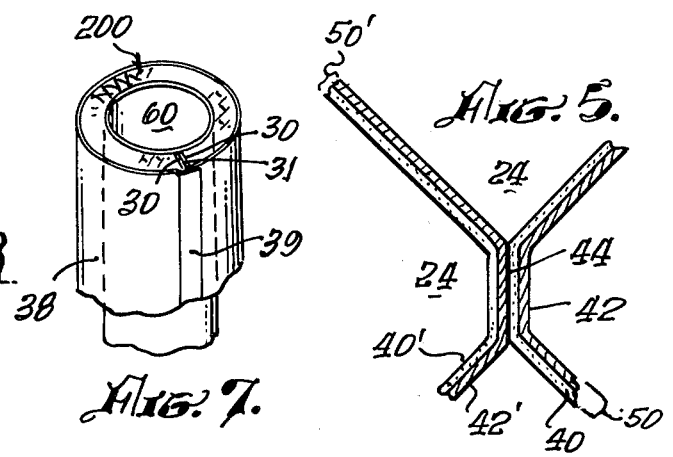
FIG. 5 is a fragmentary edge view of adjoining sheets of the laminated structure of the insulation structure.
FIG. 7 is a partial perspective view of an insulation structure of the invention installed about a cylindrical pipe.

FIG. 5 is a fragmentary end view of the insulating matrix 200, showing typical laminated sheets or partitions 50 and 50', each composed of a sheet of low-conductivity material and a sheet of reflective material. The laminated sheet 50, for example, being comprised of a layer 40 of paper and adherent layer 42 of aluminum foil and sheet 50' comprising a paper layer 40' and a foil layer 42'.

The polygonal cells of the expanded matrix are created by the presence of adhesive seams 44, spaced in parallel array at such distances that the resulting cells show optimum heat insulation properties. Such properties are attained in a structure in which the mean diameters of the cells range from ¼ inch to approximately ¾ of an inch. Since the seams, in the collapsed condition, must be spaced at a wavelength of 1⅔ of the cell diameter in the interface between adjacent sheets in the stack, the adhesive strips must be applied at spacings of ⅜ inch to 1¼ inch. The optimum combination of combined heat transfer in the three possible modes—conductive, convective and radiative—is attained when the mean cell diameter is of the order of ⅜ inch, requiring an adhesive seam spacing of ⅝ inch on manufacture. These dimensions are approximate only; in a curvilinearly applied matrix the effective diameters of the cells varies across the matrix and economic considerations may also dictate the utilization of larger cells than would be desirable for optimal insulating efficiency.

Figure 6:
FIG. 6 is a fragmentary edge view of a laminated sheet of the insulation structure, having metallic foil on both sides of an intermediate paper membrane.

FIG. 6 is a fragmentary end view of a laminated structure incorporating a central layer 46 of paper or other material of substantial structural strength and low thermal conductivity, bounded by layers 48 of an optically reflective material on either side. The layers 48 may advantageously be made from a metallic foil or from a metallized plastic.

FIG. 7 is a perspective partial view of a cylindrical conduit 60 surrounded by insulating matrix 200 whose limiting flanges 30 are brought together along a plane 31 so as to enclose the conduit 60 with insulating cells 24 whose axial alignment is parallel to the axis of the conduit. To protect the matrix 200, an external sheath 38, suitably of a heavier paper stock, is applied thereto and adhesive bonded to itself along a seam 39. The insulated conduit of FIG. 7 is an illustrative example of the manner in which the expandable matrix 200 can be applied to curvilinear surfaces and spaced through the positioning of the flanges 30 in a relatively angled alignment, the relative rotation of the flanges being 180° in the example. Because of the flexibility of the matrix 200, such angular positions can be assumed in two mutually orthogonal planes, permitting the installation of the insulating structure of the invention in modes incapable of attainment by insulations of the prior art in other than loose, unstructured volumes.

Figure 8:
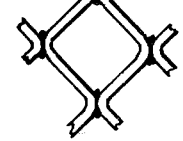
FIG. 8 is a fragmentary sectional view of a modified form of insulation structure of the invention, wherein the tubular air cells thereof are of substantially square cross-section.
Figure 9:
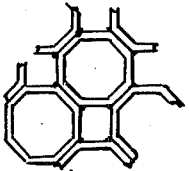
FIG. 9 is a fragmentary sectional view of another modified form of insulation structure of the invention, wherein the tubular air cells thereof are of octagonal cross-section.

FIGS. 8 and 9 illustrate modified forms of the insulation matrix structure of the invention, wherein the tubular cells, instead of being of hexagonal cross-section as shown in FIG. 2 and earlier described, are, respectively, of substantially square and octagonal cross-section. It will be understood that the tubes may be of various cross-sectional configurations.

The invention has been described hereinabove with reference to a preferred embodiment in which an insulating matrix is created by the superposition of a plurality of laminated sheets, one face to each, at least, being covered with a reflecting material. These sheets are joined to their neighbors along seams—suitably created by the application of an adhesive—in such a manner that their separation tends to create polygonal cells with impermeable walls. In embodiments of the insulating matrix in which only one face of each sheet in the array is optically reflective, it is advantageous to have these reflecting surfaces face in the same direction, preferably towards the source of heat flow.

The insulating matrix of the invention is suitable for installation in the walls of residential and other structures; around ducts, conduits, pipes and similar channels in which fluids flow at temperatures differing from that of the surrounding atmosphere; or it may be installed around refrigerators, ovens and other enclosures. Because of the isolation of the air spaces in the cells of the matrix, the insulator of the invention is also suitable as a means for reducing the transmission of airborne noise, and it may be made fire resistant, or retardant, by suitable choice of its constituent materials or through the treatment of any combustible layers in the laminated sheets by a suitable chemical agent tending to reduce the flammability thereof.

The materials employed in the insulating structure of the invention are commercially available and the manufacturing technology for the generation of the matrix-forming array is known and employed in a number of industrial arts. Variations in the exact composition of the laminates employed, in the dimensions of the individual cells formed, or in the means utilized for the installation of the matrix in the place of final use may occur to those skilled in the arts of making and installing insulating materials; such variations are deemed to be encompassed by the disclosure, the invention being solely delimited by the appended claims.

The inventor claims:

1. An insulating structure for positioning between a heat source and a sink for same, comprising:
    a plurality of cell-defining sheets of flexible laminated material,
    each said sheet comprising a layer of a first membranous material of low thermal conductivity and a layer of a second membranous material of high radiant reflectivity,
    said sheets being arrayed in an aligned stack closely spaced when in a contracted configuration of the structure,
    a pair of relatively rigid flange elements attached at the limit ends of said stack, and
    adhesive means in parallel strips spaced apart on the sheets and joining each adjacent pair of laminated sheets,
    whereby upon relative displacement of the flange elements said sheets are spread to an expanded condition of the structure to define cells of substantially polygonal cross-section in a honeycomb-like structure with the adjacent sheets secured together along seams defined by the adhesive means to provide successive thermal barriers between the heat source and the heat sink.

2. An insulating structure according to claim 1 wherein:
    the first membranous material of low thermal conductivity is a paper material.

3. An insulating structure according to claim 1, wherein:
    said second membranous material is a metallic foil.

4. An insulating structure according to claim 3, wherein:
    said metallic foil is aluminum.

5. An insulating structure according to claim 1, wherein:
    said second membranous material is a metallized plastic.

6. An insulating structure according to claim 1, wherein:
    said cell-defining sheets comprise a central layer of said first membranous material with layers of said second membranous material laminated to either face thereof.

7. An insulating structure according to claim 6, wherein:
    said first membranous material is a paper and wherein said second membranous material is an aluminum foil.

8. An insulating structure according to claim 1, wherein:
    the distance between said seams in the contracted condition of the structure, ranges between $\frac{3}{8}$ inch and one inch.

9. An insulating structure according to claim 8, wherein:
    said distance is $\frac{5}{8}$ inch.

* * * * *